United States Patent [19]
Winkelmann et al.

[11] Patent Number: 5,496,113
[45] Date of Patent: Mar. 5, 1996

[54] LINEAR BEARING ELEMENT

[75] Inventors: Ludwig Winkelmann; Hartmut Koschmieder, both of Erlangen, Germany

[73] Assignee: Ina Walzlager Schaeffler KG, Germany

[21] Appl. No.: 428,123

[22] PCT Filed: Oct. 30, 1993

[86] PCT No.: PCT/EP93/03037

§ 371 Date: Apr. 24, 1995

§ 102(e) Date: Apr. 24, 1995

[87] PCT Pub. No.: WO94/11644

PCT Pub. Date: May 26, 1994

[30] Foreign Application Priority Data

Nov. 19, 1992 [DE] Germany ............ 42 38 910.0

[51] Int. Cl.$^6$ ............................................ F16C 29/06
[52] U.S. Cl. ........................... 384/13; 384/15; 384/45
[58] Field of Search ................... 384/13, 15, 16, 384/45, 44, 43

[56] References Cited

U.S. PATENT DOCUMENTS

| | | |
|---|---|---|
| 4,927,272 | 5/1990 | Ward, Jr. . |
| 5,380,096 | 1/1995 | Tanaka ............................ 384/13 |
| 5,435,649 | 7/1995 | Kuwahara ....................... 384/13 |

FOREIGN PATENT DOCUMENTS 0491988  7/1992  European Pat. Off. .

*Primary Examiner*—Lenard A. Footland
*Attorney, Agent, or Firm*—Bierman and Muserlian

[57] ABSTRACT

The invention concerns a linear bearing element mounted on the running race of a guide rail and comprising, on at least one of its two front ends, a wiper which bears by an end region against the running face to retain lubricant in the linear bearing element, at lease one lubricant supply device, with its inlet end connected to an outer supply duct and its outlet, end connected with the bearing region being arranged on or in the bearing element.

13 Claims, 3 Drawing Sheets

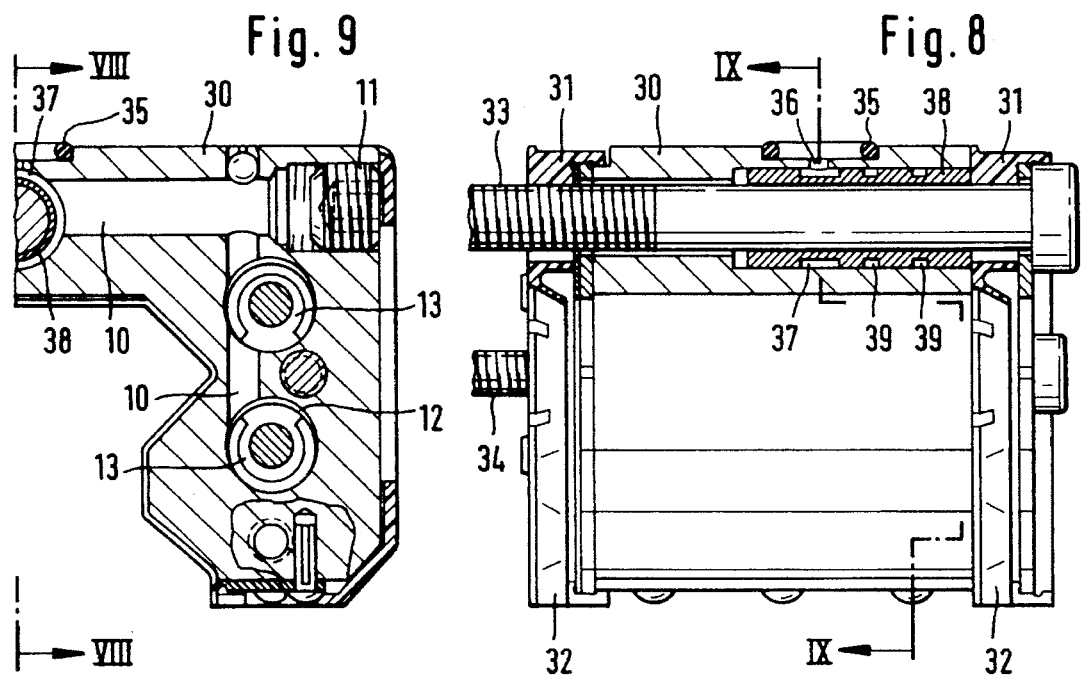
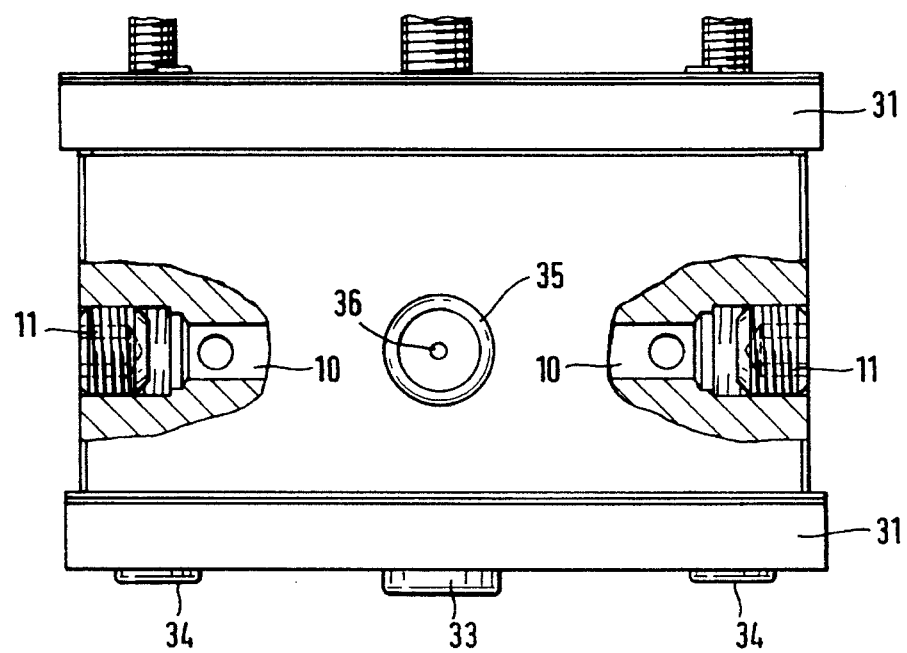

LINEAR BEARING ELEMENT

The invention concerns a linear bearing element mounted on the running face of a guide rail and comprising, on at least one of its two front ends, a wiper which bears by an end region against the running face to retain lubricant in the linear bearing element, at least one lubricant supply device, with its inlet end connected to an outer supply duct and its outlet end connected with the bearing region being arranged on or in the bearing element.

From DE-C-2 130 420 a bearing element is known which comprises a wiper unit permitting a constantly dosed lubrication of a rolling bearing by simple and inexpensive means. This device comprises a wiper made of a polymeric material with a wiping edge which is intended to clean the running face during the reciprocating motion of a bearing element made in the form of a recirculating roller shoe and thus keep away impurities from the rolling bearing while, at the same time, preventing lubricant from escaping from the bearing element. In this device, lubricant is transferred into the bearing element from the outside via an element made of an absorbent material surrounding the wiping edge which is in contact with the running face. However, it is possible that undesired emulsions present on the running face be transported into the bearing together with the lubricant.

Another linear bearing element of the initially cited type is known from U.S. Pat. No. 4,927,272 whose lubricant supply device is a lubricant injection unit with a complicated elongate structure comprising an adaptor housing, an injection pipe, a lubricant reservoir, a measuring and filtering element and distributing canals which are connected to supply canals. The supply canals are arranged in the wiper giving it a complicated structure for a spare part so that when the wiper lip is worn out, a relatively expensive component has to be replaced. Moreover, the supply device of this prior art linear bearing element is screwed directly into a threaded bore of the bearing element with a part of its length protruding out of a front end thereof and this results in large dimensions of the bearing in the longitudinal direction of the guide rail.

It is an object of the invention to provide a linear bearing having a compact wiper unit which prevents the ingress of dirt and permits the supply of defined, minimum quantities of lubricant to the running faces and bearing regions without leakage losses.

It is intended that with such a wiper unit the lubricant should be retained as far as possible completely in the bearing element so that the quantities of lubricant required for re-lubrication can be drastically reduced. Users of equipment comprising bearings having wiper units should thus be enabled to better comply with laws concerning environmental protection.

The invention achieves this object by the fact that the supply device is configured as a dosing valve and arranged in a chamber of an attachment body comprising distributing canals which are connected to the outer supply duct and open into the chamber, the attachment body being fixed on an end face of the bearing element.

Dosing valves are standard commercial components used in central lubrication systems. They open and close as a function of the pressure of the lubricant delivered.

Each attachment body of the bearing element can be made as a component having a U-shaped cross-section surrounding the guide rail and comprising a plurality of chambers in which dosing valves are arranged.

The wiper can be made as a plate-shaped component arranged between the attachment body and the bearing element. It is appropriate, in this case, to arrange a transfer opening in the wiper to connect the dosing valve at its outlet end with the bearing region. However, it is also possible to arrange the wiper on the end face of the attachment body away from the bearing element.

A simple method of fabrication comprises making the chambers for the dosing valves in the form of pocket bores in the attachment body.

The dosing valve can be configured as a bush-type component comprising spaces arranged axially behind one another to form the inlet opening, the dosing chamber, the discharge chamber and the outlet opening. Within the chamber of the attachment body, the valve can be surrounded by a sealing ring separating the inflow region of the chamber from the discharge region. A securing of the dosing valve against axial displacement can be assured by a cylindrical pin pressed into a bore of the attachment body and engaging into an annular groove of the dosing valve. An axial fixing of the dosing valve can also be obtained by screwing it into the chamber which, in this case, is made at least partially as a threaded bore.

It is also possible to make the dosing valve, for instance, out of two bush-type components arranged next to each other with parallel axes and to arrange one behind the other, an inlet opening and a dosing chamber in one of the components, and a discharge chamber and an outlet opening in the other component, the components being provided with a front end connection between the dosing chamber and the discharge chamber. The two components of the dosing valve may also be disposed one on the attachment body and one on the bearing element.

Examples of embodiment of the invention are represented in the drawings and will be described more closely in the following.

BRIEF DESCRIPTION OF THE DRAWINGS

FIG. 8 is a longitudinal cross-section through another embodiment of a wiper unit, FIG. 9 is a cross-section of the wiper unit taken along line IX—IX of FIG. 8, and FIG. 10 is a top view of the wiper unit showing two partial sections.

Figure 1:
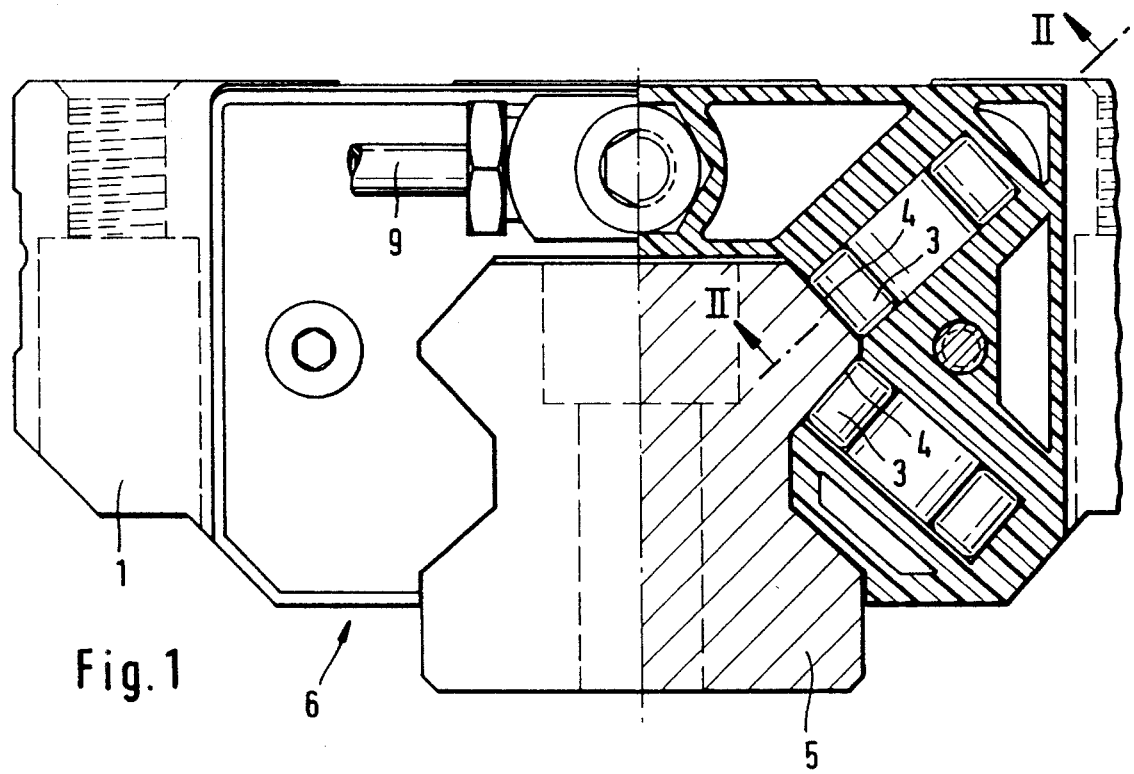
FIG. 1 is partially an end view and partially a cross-section of a bearing element having a wiper unit arranged on a guide rail.

As can be seen in FIGS. 1 to 7, a bearing element 1 of the invention has a wiper unit fixed on a front end thereof. The bearing element 1 comprises a carrier body with two deflector bodies arranged adjacent to front ends thereof. Bearing regions 2 of the bearing element 1 comprising rolling elements 3 are supported on running faces 4 of a guide rail 5. The wiper unit comprises an attachment body 6 which is configured as a carrier body for lodging dosing valves and which has a plate-shaped wiper 7 arranged thereon. During the reciprocating motion of the bearing element 1 along the guide rail 5, the end of a wiper lip 8 slides on the running faces 4 of the guide rail 5 thereby preventing an escape of lubricant from the bearing region 2 and a penetration of dirt into the bearing.

Figure 2:
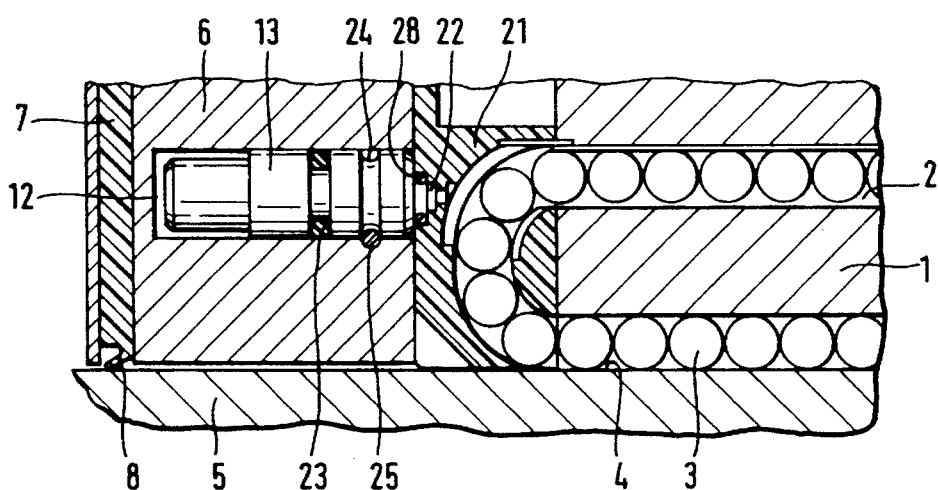
FIG. 2 is a longitudinal cross-section taken along line II—II of FIG. 1 showing the bearing element and the wiper unit disposed thereon.
Figure 3:
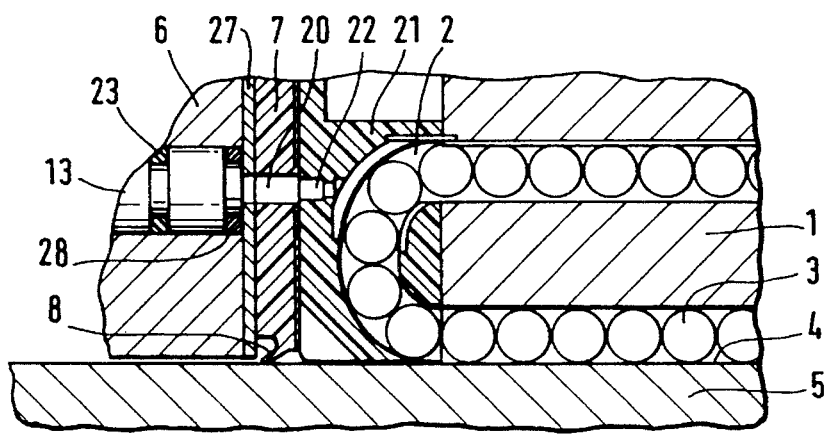
FIG. 3 shows the bearing element of FIG. 2 having a modified wiper unit.
Figure 4:
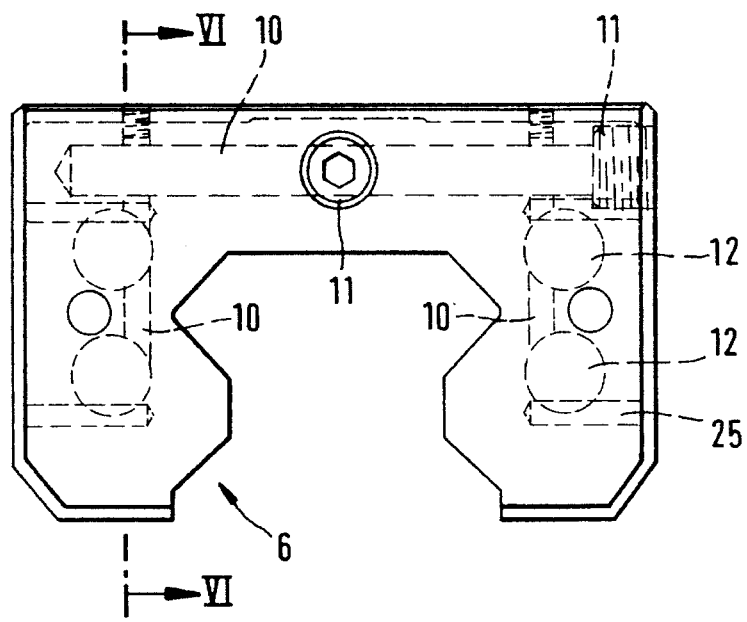
FIG. 4 is an end view of the modified wiper unit.
Figure 5:
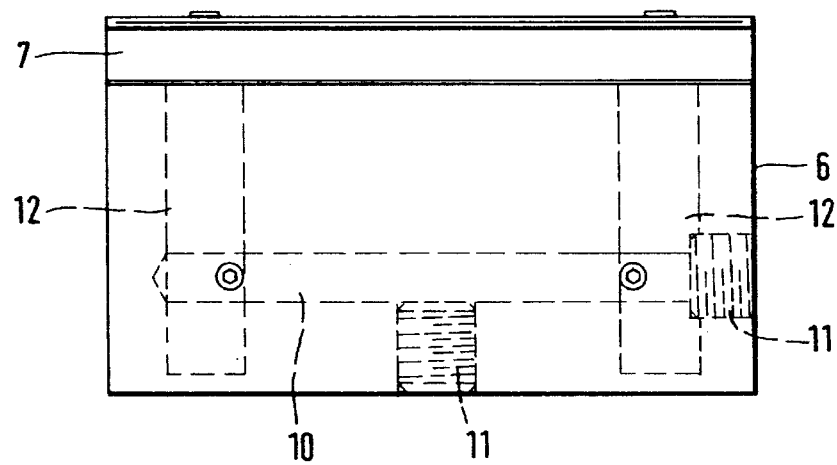
FIG. 5 is a top view of the wiper unit.
Figure 7:
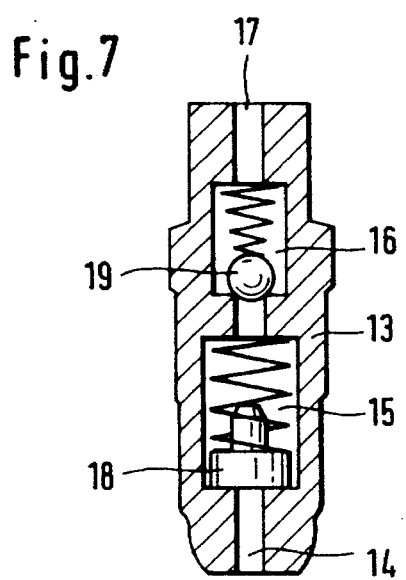
FIG. 7 is a longitudinal cross-section of a dosing valve.

The wiper 7 of FIG. 2 is fixed on the front end of the attachment body 6 away from the bearing element 1 while the wiper 7 of the wiper unit of FIG. 3 is arranged between front ends of the attachment body 6 and of the bearing element 1.

Lubricant is supplied to the wiper unit from the outside via a supply duct 9. Distributing canals 10 in the form of bores are arranged for this purpose in the attachment body 6 and can be sealed from the outside by sealing screws 11. The distributing canals 10 open into chambers 12 made in the form of pocket bores in each of which a dosing valve 13 is arranged.

A dosing valve 13 can be configured as a bush-type component comprising axially behind one another, an inlet opening 14, a dosing chamber 15, a discharge chamber 16 and an outlet opening 17. Between the dosing chamber 15, in which is disposed a spring-loaded piston 18, and the discharge chamber 16, there is arranged a non-return valve having a closing element in the form of a spring-loaded ball 19.

In the embodiment represented in FIGS. 3 to 6, each dosing valve 13 is arranged in a chamber 12 so that its inlet opening 14 is downstream of the adjacent distributing canal 10, while its outlet opening 17 adjoins the wiper 7 where lubricant can flow out of the attachment body 6 through a transfer opening 20 into the bearing element 1 which is composed of a carrier body 29 and two deflector bodies 21. These deflector bodies 21 for the rolling elements 3 of the bearing element 1 adjoin the carrier body 29 and likewise comprise transfer openings 22 which communicate with the transfer openings 20 of the wiper 7. In the embodiment of FIG. 2, the transfer openings 22 of the deflector bodies 21 are connected directly with the transfer opening 17 of the dosing valves 13.

Each dosing valve 13 arranged in a chamber 12 is sealed with a sealing ring 23 which seals the inlet opening-end of the chamber 12 from its outlet opening-end. The sealing ring 23 is an O-ring seal inserted into a peripheral groove of the dosing valve 13.

The dosing valve 13 further comprises a second annular groove 24 on its outer surface into which a cylindrical pin 25 arranged in a bore of the attachment body 6 engages at one peripheral point to secure the dosing valve 13 against axial displacement.

The supply of lubricant to the bearing regions 2 is effected by the fact that lubricant is transported under pulsating pressure via the supply duct 9 and the distributing canals 10 into the chambers 12 and the inlet openings 14 of the dosing valves 13. This causes the piston 18 to be displaced in the dosing chamber 15 against the action of its pressure spring, and lubricant present in the dosing chamber 15 is thereby transported towards the non-return valve so that the ball 19 is lifted from its seat against the action of its pressure spring thus allowing lubricant to enter into the discharge chamber 16. Such a pressure pulse therefore causes the piston which is guided with play in the housing bore of the dosing valve to leave its position of rest so that the lubricant present in front of the piston is displaced through the non-return valve into the discharge chamber 16 and from there, through the outlet opening 17, into the bearing region. When the piston reaches its end position, the piston tip seals the dosing chamber 15 in the direction of the non-return valve. Upon a relief of pressure, the piston spring pushes the piston 18 back into its position of rest and the dosing chamber 15 is refilled with lubricant via the annular gap between the piston 18 and the housing bore of the dosing valve. The non-return valve prevents a back-flow of lubricant.

Figure 6:
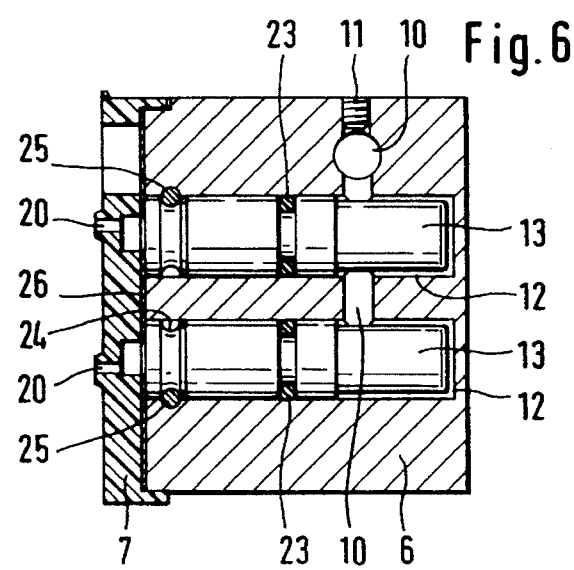
FIG. 6 is a vertical longitudinal cross-section taken along line VI—VI of FIG. 4.

The inner contour of the attachment body 6 facing the guide rail 5 can be configured so as to form a small gap on the guide rail 5 to serve as a pre-segregator for chips and other coarse impurities. As shown in FIG. 6, the sealing of the transfer openings 20 and of the joint between the attachment body 6 and the wiper 7 can be effected by a sealing plate 26 arranged between the attachment body 6 and the wiper 7.

It is also possible to additionally support the dosing valves 13 at their outlet opening-end by an additional plate 27 fixed on a front end of the attachment body 6. To absorb the thrust forces of the dosing valves 13, the plate 27 can be screwed to the attachment body 6. In this embodiment, which is shown in FIG. 3, it is appropriate to arrange a sealing ring 28 between the plate 27 and the dosing valve 13. The embodiment of FIG. 2 likewise comprises a sealing ring 28 for the dosing valve 13.

To reduce the overall length of the attachment body 6, the dosing valve can be comprised of two bushes arranged next to each other with parallel axes, in which case, the dosing chamber 15 is arranged in one of the bushes and the discharge chamber 16 in the other bush. An overflow canal is then required to connect the two chambers to one another. The bush with the dosing chamber 15 and the bush with the discharge chamber 16 can both be pressed into their respective lodging bores.

The attachment body 6 and the wiper 7 can be made together in the form of an inseparable unit of a high strength plastic material, for example, glass fiber reinforced polyamide. These two elements can be joined together by ultrasonic welding, in which case, no sealing is required between them. The wiper lip 8 can be spray-molded on the wiper 7 but it is equally possible to arrange this lip in a receiving groove and clamp it between two parts or fix it there by positive engagement in some other way.

The dosing chamber and the discharge chamber may be arranged optionally in series or parallel to one another, and the non-return valve can be constituted by a ball with a compact diaphragm spring. A particularly economic structural unit is obtained if the dosing valves 13 are not comprised of separate bushes but the dosing chamber and the discharge chamber are formed in the material of the attachment body or of the deflector body. In lieu of the known types of commercial dosing valves, it is also possible to use valves of other known types, for example plate valves or solenoid valves. The attachment body 6, the wiper 7 with the wiper lip 8 and the deflector body 21 can all be made together as a one-piece component.

Monitoring elements in the form of pressure sensors, microswitches or proximity switches can be integrated in the dosing valve 13 in the dosing chamber 15 or the discharge chamber 16 thereof, or in the canal connecting these chambers to one another or in the canal leading to the outlet opening 17.

The modified wiper unit shown in FIGS. 8 to 10 comprises an attachment body 30 and two wipers 31 with wiper lips 32 adjoining the front ends of the attachment body 30. The wipers 31 and the attachment body 30 are jointly fixed on the bearing element 1 by one central screw 33 and by further screws 34. The lubricant distributing canals 10 extending within the attachment body 30 can be optionally connected with the supply duct 9 by a plurality of bores leading to the outside. In the example of embodiment, two of these bores extending in a horizontal direction are sealed by sealing screws 11 while a vertical bore 36 surrounded by a sealing ring 35 is connected via a large annular groove 37 of a reversible bush 38 with a horizontal distributing canal 10 leading to the dosing valves 13.

The reversible bush 38 is fitted into a bore of the attachment body 30 and surrounds the central screw 33. In addition to the large annular groove the reversible bush 38 comprises two further, small annular grooves 39 on its outer surface which are arranged spaced axially behind one another so that when the reversible bush 38 is taken out of the attachment body turned through 180° about an axis perpendicular to its own axis and then re-placed in its new position into the attachment body 30, no annular groove is located under the bore 36. In this way, the connection between the bore 36 leading to the outside and the distributing canals 10 is interrupted.

This arrangement can be used when, after the removal of a sealing screw 11, lubricant is to be fed into the attachment body 30 via the thus obtained opening of the distributing canal 10 concerned. In this new position of the reversible bush 38, the two small annular grooves 39, which are disposed next to the bore 36 but not connected with it, establish a connection between the two distributing canals 10 extending on either side of the central screw 33. Lubricant flowing in from the supply duct 9 can thus be transferred from a single location on the attachment body 30 to all the dosing valves 13 arranged in the attachment body 30.

The embodiments of the invention are not limited to linear elements mounted on rolling bearings but can be used equally well in bearing elements having sliding bearings.

Reference Numbers

| | | | |
|---|---|---|---|
| 1 | Bearing element | 21 | Deflector body |
| 2 | Bearing region | 22 | Transfer opening |
| 3 | Rolling element | 23 | Sealing ring |
| 4 | Running face | 24 | Annular groove |
| 5 | Guide rail | 25 | Cylindrical pin |
| 6 | Attachment body | 26 | Sealing plate |
| 7 | Wiper | 27 | Plate |
| 8 | Wiper lip | 28 | Sealing ring |
| 9 | Supply duct | 29 | Carrier body |
| 10 | Distributing canals | 30 | Attachment body |
| 11 | Sealing screw | 31 | Wiper |
| 12 | Chamber | 32 | Wiper lip |
| 13 | Dosing valve | 33 | Central screw |
| 14 | Inlet opening | 34 | Screw |
| 15 | Dosing chamber | 35 | Sealing ring |
| 16 | Discharge chamber | 36 | Bore |
| 17 | Outlet opening | 37 | Large annular groove |
| 18 | Piston | 38 | Reversible bush |
| 19 | Ball | 39 | Small annular groove |
| 20 | Transfer opening | | |

We claim:

1. A linear bearing element (1) mounted on a running face (4) of a guide rail (5) and comprising, on at least one of its two front ends, a wiper (7, 31) which bears by an end region against the running face (4) to retain lubricant in the bearing element (1), at least one lubricant supply device, with its inlet end connected to an outer supply duct (9) and its outlet end connected with the bearing region (2) being arranged on or in the bearing (1), characterized in that the supply device is configured as a dosing valve (13) and arranged in a chamber (12) of an attachment body (6, 30) comprising distributing canals (10) which are connected to the outer supply duct (9) and open into the chamber (12), the attachment body (6, 30) being fixed on an end face of the bearing element (1).

2. A bearing element of claim 1 wherein the chamber (12) for the dosing valve (13) in the attachment body (6, 30) is made in the form of a pocket bore.

3. A bearing element of claim 1 wherein the bearing region (2) connected with the dosing valve (13) is made as a rolling element circuit in a carrier body (29) and two deflector bodies (21) of the bearing element (1).

4. A bearing element of claim 1 wherein the attachment body (6, 30) is made as a component having an essentially U-shaped cross-section surrounding the guide rail (5) and comprising a plurality of chambers (12) in which dosing valves (13) are arranged.

5. A bearing element of claim 1 wherein the wiper (7, 31) is made as a plate-shaped component and arranged between the attachment body (6, 30) and the bearing element (1).

6. A bearing element of claim 1 wherein the wiper (7, 31) is arranged on the end face of the attachment body (6, 30) away from the bearing element (1).

7. A bearing element of claim I wherein the wiper (7) comprises a transfer opening (20) by which the dosing valve (13) is connected at its outlet end with the bearing region (2) formed by the bearing element (1) and the guide rail (5).

8. A bearing element of claim 1 wherein the dosing valve (13) is configured as a bush-type component comprising spaces arranged axially behind one another which form an inlet opening (14), a dosing chamber (15), a discharge chamber (16) and an outlet opening (17).

9. A bearing element of claim 1 wherein the dosing valve (13) is surrounded, within the chamber (12) of the attachment body (6), by a sealing ring (23) which separates an inflow region of the chamber (12) from a discharge region thereof.

10. A bearing element of claim 1 wherein the dosing valve is formed by two bush-type components arranged next to each other with parallel axes and wherein an inlet opening and a dosing chamber are arranged behind one another in one of two said components, and a discharge chamber and an outlet opening are arranged behind one another in other of two said components, the components being provided with a front end connection between the dosing chamber and the discharge chamber.

11. A bearing element of claim 1 wherein the distributing canals (10) in the attachment body (30) between the chamber (12) for the dosing valve (13) and the supply duct (9) are connected to one another by annular grooves (37, 39) of a reversible bush (38) fitted into a receiving bore of the attachment body (30).

12. A bearing element of claim 11 wherein the reversible bush (38) comprises a plurality of annular grooves starting from an outer surface thereof and comprising one large annular groove (37) and two small annular grooves (39) arranged axially spaced behind one another.

13. A bearing element of claim 12 wherein, in one position of the reversible bush (38) inserted into the attachment body (30), the large annular groove (37) is open towards the outside via a bore (36) of the attachment body (30).

\* \* \* \* \*